(12) United States Patent
Foladare et al.

(10) Patent No.: US 8,713,601 B2
(45) Date of Patent: Apr. 29, 2014

(54) SYSTEM AND METHOD FOR CONTENT DELIVERY

(75) Inventors: Mark Foladare, East Brunswick, NJ (US); Paul Gausman, Bridgewater, NJ (US)

(73) Assignee: AT&T Intellectual Property I, L.P.

( * ) Notice: Subject to any disclaimer, the term of this patent is extended or adjusted under 35 U.S.C. 154(b) by 668 days.

(21) Appl. No.: 12/272,584

(22) Filed: Nov. 17, 2008

(65) Prior Publication Data
US 2010/0125868 A1 May 20, 2010

(51) Int. Cl.
*H04N 7/10* (2006.01)

(52) U.S. Cl.
USPC .............................................. 725/34; 725/32

(58) Field of Classification Search
None
See application file for complete search history.

(56) References Cited

U.S. PATENT DOCUMENTS

| | | | |
|---|---|---|---|
| 6,084,866 A * | 7/2000 | Dorenbosch et al. | 370/331 |
| 6,240,555 B1 * | 5/2001 | Shoff et al. | 725/110 |
| 6,978,470 B2 | 12/2005 | Swix | |
| 7,613,691 B2 * | 11/2009 | Finch | 1/1 |
| 2002/0059094 A1 * | 5/2002 | Hosea et al. | 705/10 |
| 2003/0121037 A1 * | 6/2003 | Swix et al. | 725/34 |
| 2004/0049780 A1 * | 3/2004 | Gee | 725/32 |
| 2006/0149625 A1 * | 7/2006 | Koningstein | 705/14 |
| 2006/0212900 A1 * | 9/2006 | Ismail et al. | 725/34 |
| 2006/0225093 A1 * | 10/2006 | Huttunen et al. | 725/39 |
| 2007/0028264 A1 * | 2/2007 | Lowe | 725/35 |
| 2007/0220575 A1 * | 9/2007 | Cooper et al. | 725/118 |
| 2007/0261072 A1 * | 11/2007 | Boulet et al. | 725/14 |
| 2008/0062881 A1 * | 3/2008 | Martin et al. | 370/238 |
| 2008/0066106 A1 * | 3/2008 | Ellis et al. | 725/40 |
| 2008/0301727 A1 * | 12/2008 | Cristofalo et al. | 725/35 |
| 2008/0320543 A1 * | 12/2008 | Wang et al. | 725/131 |
| 2009/0019509 A1 * | 1/2009 | Horn et al. | 725/118 |
| 2009/0217316 A1 * | 8/2009 | Gupta | 725/32 |
| 2009/0293080 A1 * | 11/2009 | Ramanathan et al. | 725/20 |
| 2010/0240455 A1 * | 9/2010 | Gagner et al. | 463/30 |

OTHER PUBLICATIONS

Society of Cable Telecommunications Engineers, Inc., ANSI/SCTE 35 2004, (37 pages).
Michael Benner and Musa Unmehopa,Tthe Open Mobile Alliance: Delivering Service Enables for Next-Generation Applications, (492 pages), Published by John Wiley & Sons, Ltd, Mar. 2008.

* cited by examiner

*Primary Examiner* — Chenea Smith
(74) *Attorney, Agent, or Firm* — Toler Law Group, PC

(57) ABSTRACT

Systems and methods of content delivery are provided. A particular content delivery system includes a gateway to deliver content to an end user device. The particular content delivery system also includes a content delivery module to deliver content to the gateway for display on the end user device. The particular content delivery module also includes a management controller. The particular content delivery system also includes an out-of-band signaling controller which receives input from the management controller and provides signaling to control the gateway.

20 Claims, 9 Drawing Sheets

SYSTEM AND METHOD FOR CONTENT DELIVERY

FIELD

The present disclosure is generally related to a content delivery system and methods.

DESCRIPTION OF RELATED ART

Content delivery systems for delivery of video provide for insertion of advertising into the master content before viewing by a user. Advertising slots may be made available, for example, to local advertisers and inserted at a local level into nationally broadcast television programming. It would be advantageous to provide for improvements in insertion of advertisements and other content in video viewed by users as well as providing other improvements in delivery of video content to the users.

DETAILED DESCRIPTION

A particular content delivery system includes a gateway to deliver content to an end user device. The particular content delivery system also includes a content delivery module to deliver content to the gateway for display on the end user device. The particular content delivery module also includes a management controller. The particular content delivery system also includes an out-of-band signaling controller which receives input from the management controller and provides signaling to control the gateway.

A second particular embodiment includes a gateway. The gateway includes a first interface to receive master content and supplemental content. The gateway also includes a second interface to receive control signals from an out-of-band signaling controller. The gateway also includes a third interface to deliver the master content to an end user device and to deliver supplemental content, under control of the control signals, to the end user device.

A third particular embodiment includes an out-of-band signaling controller. The out-of-band signaling controller includes a processor. The out-of-band signaling controller also includes a memory accessible to the processor. The memory includes instructions executable by the processor to receive end user profile information, to signal a content delivery module to deliver supplemental content for display at end user devices, to control display of the supplemental content at the end user devices based on the end user profile information. The display of the supplemental content is controlled using the signals sent out-of-band from the delivery of the supplemental content.

A fourth particular embodiment includes a method of delivering supplemental content to an end user device. The method includes receiving, at a gateway, master content for delivery to the end user device. The method also includes receiving, at the gateway, supplemental content for delivery to the end user device. The method also includes receiving, at the gateway, control signals from an out-of-band signaling controller. The control signals are received at the gateway out-of-band from delivery of the master content and the supplemental content. The method also includes sending the master content to the end user device. The method also includes sending the supplemental content to the end user device in response to the signals received from the out-of-band signaling controller. The control signals are received at the gateway out-of-band from the delivery of the master content and the supplemental content.

Figure 1:
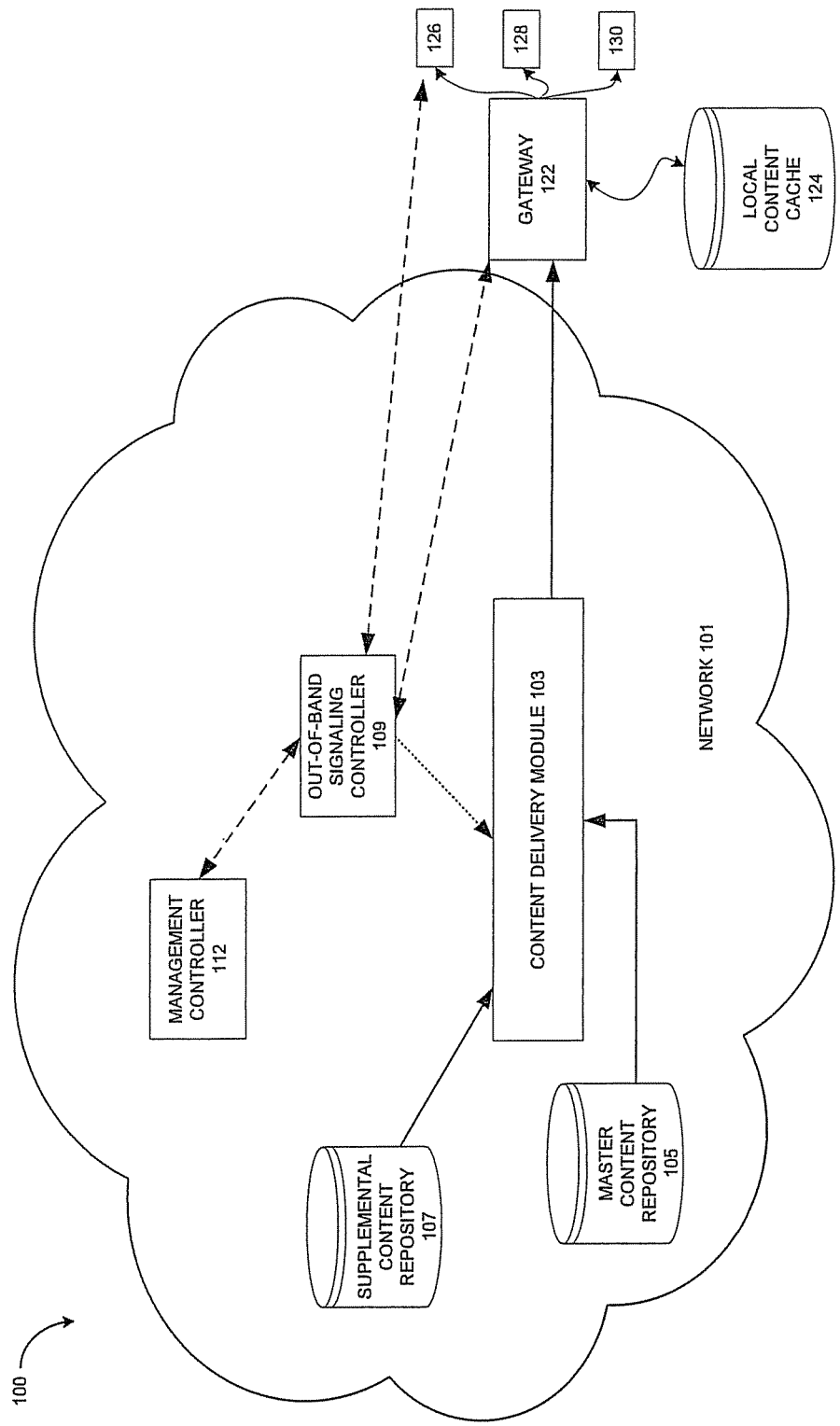
FIG. 1 is a block diagram of a first particular embodiment of a content delivery system.

Referring to FIG. 1, a first particular embodiment of a content delivery system is shown and generally designated 100. The delivery system 100 includes an overall network 101 including a content delivery module 103 configured to communicate with a gateway 122. The gateway 122 may be configured to deliver content to an end user device, such as end user devices 126, 128, and 130. In a particular embodiment, the end user devices 126, 128, and 130 may be home-based devices such as a television, a desktop computer or a laptop computer. In another particular embodiment, the end user devices 126, 128, and 130 may be mobile devices, such as a cellular telephone or a personal digital assistant (PDA). In another particular embodiment, the delivery system 100 may include multiple gateways 122 such as a media access gateway and a cellular gateway. One or more of the end user devices 126, 128 and 130 may be configured to communicate via the media access gateway (such as, home based devices), and one or more of the end user devices 126, 128 and 130 may be configured to communicate via the cellular gateway (such as, mobile devices.) In other particular embodiments, various combinations of gateways and end user devices may be utilized.

In a particular embodiment, the content includes video content. In another particular embodiment, the content includes television programming. In another particular embodiment, the delivery system 100 is an interactive television (ITV) system allowing an end user to request particular television, video, other content, or any combination thereof. In another particular embodiment, the content is delivered through the network 101 in a packet format. In another particular embodiment, content is delivered through the network 101 in an internet protocol (IP) packet format and may include television programming and, thus the delivery system 100, in the particular embodiment, may be referred to as an internet protocol television (IPTV) network.

In a particular embodiment, the delivery system 100 includes a local content cache 124. The gateway 122 may be configured to receive content from the content delivery module 103 and to store the received content from the content delivery module 103 at the local content cache 124.

In a particular embodiment, the delivery system 100 includes, within the network 101, the content delivery module 103 configured to deliver content to the gateway 122 for display at one of end user devices 126, 128, and 130. In addition, the delivery system 100 may include a master content repository 105. The content delivery module 103 may be configured to receive content from the master content repository 105. The master content repository 105 may store video content. In a particular embodiment, the master content repository 105 stores television programming. In another particular embodiment, the content stored on master content repository 105 includes locations for insertion of supplemental content. In another particular embodiment, the content stored on master content repository 105 includes locations for insertion of supplemental content, such as advertising.

In a particular embodiment, the delivery system 100 includes an out-of-band signaling controller 109 and a management controller 112. The out-of-band signaling controller 109 may be configured to receive input from the management controller 112 and to provide signaling to control the gateway 122. The out-of-band signaling controller 109 may also be configured to control the content delivery module 103. In a particular environment, the out-of-band signaling controller 109 includes a session initiation protocol (SIP) controller. In another particular environment, the out-of-band signaling controller 109 includes an interne protocol (IP) multimedia subsystem (IMS) session initiation protocol (SIP) controller.

Regardless of the particular controller, in a particular embodiment, the use of out-of-band signaling enables remote control of delivery of content to the end user devices 126, 128 130 over the network 101. For example, the content delivered to a particular end user device may be controlled based on policies, rules or any combination thereof of the management controller 112. Remote control of the content delivered to individual end user devices enables personalization of the user experience down to granularities of the user account or the individual user including personalization of insertion of supplemental content such as advertisements, sequencing of content, insertion of other types of content, or any combination thereof.

In a particular embodiment, the delivery system 100 includes a supplemental content repository 107. The supplemental content repository 107 may store supplemental content. In a particular embodiment, the supplemental content may include advertising. In a particular embodiment, the content delivery module 103 is configured to receive supplemental content from the supplemental content repository 107. In another particular embodiment, the content delivery module 103 is configured to receive supplemental content from the supplemental content repository 107 and to deliver the supplemental content from the supplemental content repository 107 to the gateway 122. For example, the content delivery module 103 may receive supplemental content from the supplemental content repository 107 and deliver the supplemental content to the gateway 122 in response to control signals from the out-of-band signaling controller 109.

In another particular embodiment, the gateway 122 is configured to deliver content, including content from the master content repository 105 and content from the supplemental content repository 107 in response to signaling from the out-of-band signaling controller 109. The signaling from the out-of-band signaling controller 109 may be based on certain parameters. For example, the signaling from the out-of-band signaling controller 109 may be based on parameters including: characteristics of a particular end user, context of other content delivered to a particular end user device, a bidding function, available supplemental content, or any combination thereof.

The characteristics of a particular user may be communicated from the gateway 122 to the out-of-band signaling controller 109 and be stored at the management controller 112. The characteristics may include, by way of example, information regarding the age, gender, income, marital and family status, interests, occupation, political orientation and the like of the user. The characteristics, in certain embodiments, are provided by the user when the user activates service with a service provider providing delivery of the content. In other embodiments, certain of the characteristics are provided by the user after initiating the service. In other embodiments, certain of the characteristics are determined based on empirical data such as content viewing habits of the user.

The context of other content delivered to the particular end user device may include the type of master content currently being delivered, historical information regarding the type of master content previously delivered, information regarding the type of master content scheduled to be delivered, or any combination thereof. Information regarding the context of other content delivered to the particular end user may be available to the out-of-band signaling controller 109 because in certain embodiments, the out-of-band signaling controller 109 provides control signals to the content delivery module 103 to control delivery of the master content. In other embodiments, the content delivery module 103 is configured to provide information regarding historical content, current content and content to be delivered to an end user device to the out-of-band signaling controller 109. Information regarding the context of content viewed, whether historically, presently or scheduled, may be used for selection of advertisements for viewing. For example, advertisements for cooking products may be shown to viewers who have watched cooking shows.

In a particular embodiment, the out-of-band signaling controller 109 is configured to communicate directly with the supplemental content repository 107 to obtain information regarding the available supplemental content. In another embodiment, out-of-band signaling controller 109 is configured to communicate with the content delivery module 103 to obtain information regarding the available supplemental content stored on supplemental content repository 107.

In a particular embodiment, an advertiser causes supplemental content to be stored at the supplemental content repository 107. The advertisers may include, with the supplemental content, bidding information indicating amounts that will be paid for presentation of the advertisements to end users fitting certain parameters, such as demographic characteristics, location of the end user, context of other content viewed by the end user, or any combination thereof. The out-of-band signaling controller 109 may be configured to implement a bidding function to select supplemental content to be provided to an end user device based on the bidding information.

In a particular embodiment, the gateway 122 includes an interface to receive master content, such as from the master content repository 105 through the content delivery module 103. The gateway 122 may also receive supplemental content through the interface, such as from the supplemental content repository 107 through the content delivery module 103. The gateway 122 may also include an interface to deliver the master content to one or more of the end user devices 126, 128 and 130. The gateway 122 may also include an interface to receive control signals from the out-of-band signaling controller 109. The gateway 122 may deliver the supplemental content to the one or more end user devices 126, 128 and 130 under the control of the control signals. In a particular embodiment, the gateway 122 also includes an interface to store the supplemental content at the local content cache 124.

The gateway 122 may also include an interface to deliver characteristics of the end user and location information of the end user, to the out-of-band signaling controller 109. Delivering location information may be particularly useful in the case of mobile end user devices. In the case of mobile end user devices, location information may be useful in selection of supplemental content for delivery to the end user devices. For example, in a particular embodiment, advertisements for a restaurant, stores or other establishment near the location of the mobile end user device are delivered to the mobile end user device based on the location information.

In a particular embodiment, the gateway 122 includes a processor and a memory accessible to the processor. The memory may include instructions executable by the processor to insert the supplemental content into the master content while the gateway 122 is delivering the master content to one or more of the end user devices 126, 128 and 130. In a particular embodiment, the master content may include markers marking the location for insertion of the supplemental content. In another particular embodiment, the memory may include instructions executable by the processor to locate markers marking the location for insertion of the supplemental content. In another particular embodiment, the memory may include instructions executable by the processor to determine locations for insertion of the supplemental content such as, for example, by locating the position of other advertisements within the master content and replacing the other advertisements with the supplemental content.

In a particular embodiment, the out-of-band signaling controller 109 includes a processor and a memory accessible to the processor. The memory may include instructions executable by the processor to receive end user profile information, to signal the content delivery module 103 to deliver supplemental content for display at one or more of the end user devices 126, 128 and 130, and to control display of the supplemental content at end user devices 126, 128 and 130 based on the end user profile information. In a particular embodiment, the signals from the out-of-band signaling controller 109 are sent out-of-band from delivery of the supplemental content. For example, the out-of-band delivery of the signals may be accomplished by transmission of the signals over a separate physical connection from the connection used to deliver the supplemental content. In another example, the out-of-band delivery of the signals may be accomplished by transmission of the signals over the same physical connection as used to deliver the supplemental content but using separate bandwidth on the physical connection.

Figure 2:
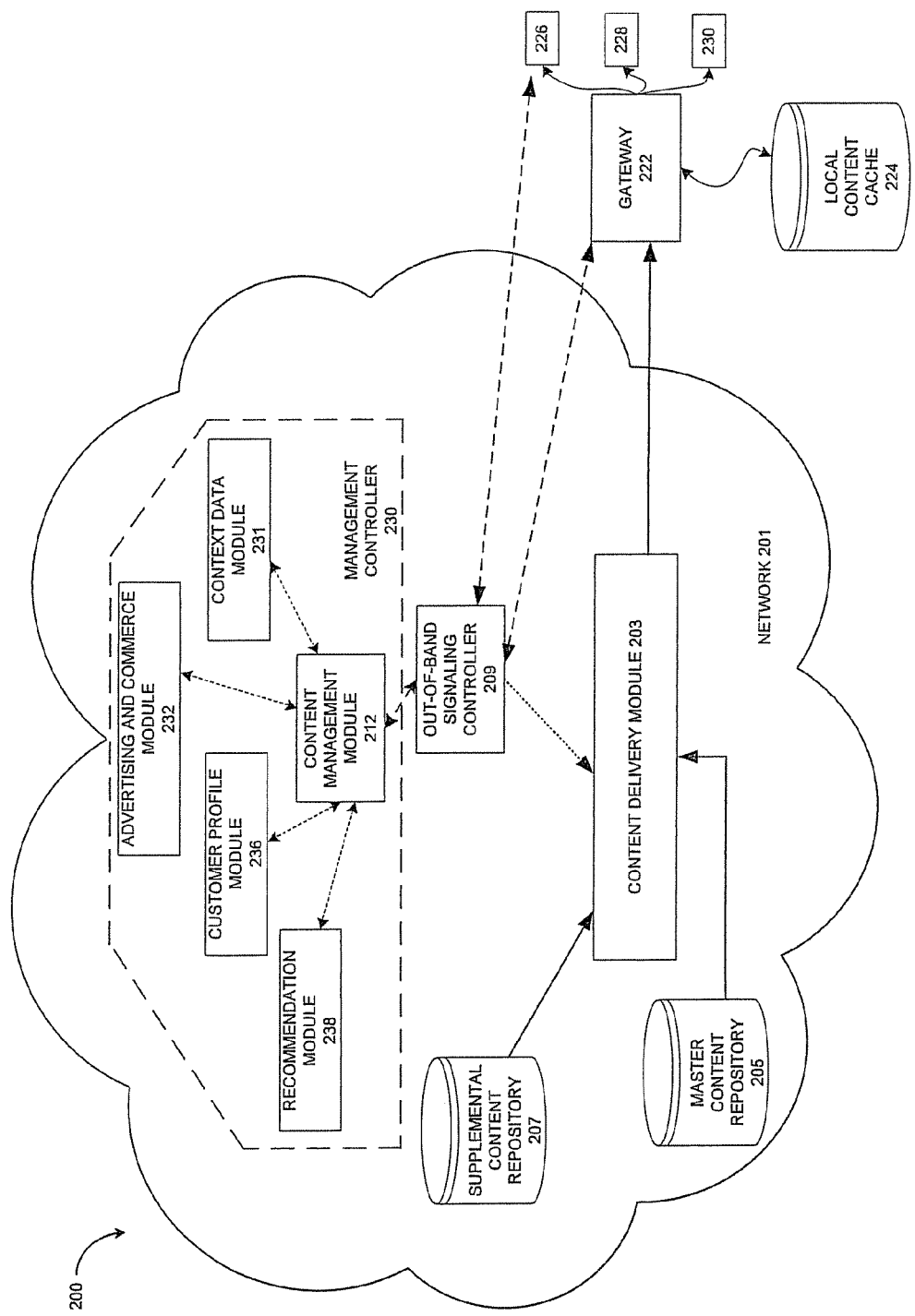
FIG. 2 is a block diagram of a second particular embodiment of a content delivery system.

Referring to FIG. 2, a block diagram of a second particular embodiment of a content delivery system is shown and generally designated as 200. The content delivery system 200 includes a content delivery module 203, a master content repository 205, and a supplemental content repository 207 in a network 201. In a particular embodiment, the content delivery module 203, the master content repository 205, and the supplemental content repository 207 deliver master content and supplemental content to a gateway 222 under control of control signals from an out-of-band signaling controller 209. For example, the content delivery module 203, the master content repository 205, and the supplemental content repository 207 may deliver master content and supplemental content to the gateway 222 in a manner such as was described with respect to the various embodiments of the delivery system 100 of FIG. 1.

In a particular embodiment, the master content and the supplemental content are delivered by the gateway 222 to end user devices, such as end user devices 226, 228 and 230. In addition, the supplemental content may be stored at a local content cache 224 by the gateway 222. The gateway 222 may store the supplemental content at the local content cache 224 in a manner such as was described with respect to the various embodiments of the delivery system 100 of FIG. 1.

In a particular embodiment, gateway 222 is configured to receive and send signals and information to the out-of-band signaling controller 209 out-of-band with transmission of the master content and supplemental content from content delivery module 203. For example, the gateway 222 may be configured to receive and send signals and information to the out-of-band signaling controller 209 in a manner such as was described with respect to the various embodiments of the delivery system 100 of FIG. 1.

The out-of-band signaling controller 209 may be coupled to communicate with a management controller 230 including a content management module 212, a recommendation module 238, a customer profile module 236, an advertising and commerce module 232 and a context data module 231. The content management module 212 may be configured to manage content for delivery to the gateway 222 by the content delivery module 203 and to manage signaling by the out-of-band signaling controller 209 transmitted to the gateway 222. The content management module 212 may manage the content for delivery by communicating with the recommendation module 238, the customer profile module 236, the advertising and commerce module 232 and the context data module 231. The customer profile module 236 may store profile information regarding customers and other end users. For example, the profile information may include age, gender, income, marital and family status, interests, occupation, political orientation and the like. The advertising and commerce module 232 may store information related to available advertisements stored at the supplemental content repository 207, such as information related to customer profile parameters desirable for selection of a particular advertisement, information related to bidding (such as maximum bids information) related to particular advertisements, information related to a desirable frequency and reach of a particular advertisement, and the like. The context data module 231 may store information related to content viewed by, being viewed by or scheduled to be viewed by an end user and may also store information related to the location of end user devices. The content management module 212 accepts information from the customer profile module 236, the advertising and commerce module 232 and the context data module 231 and provides the information to the recommendation module 238, which is configured to accept the information and recommend particular advertisements or other supplemental content to be delivered to the gateway 222 for viewing at an end user device.

Figure 3:
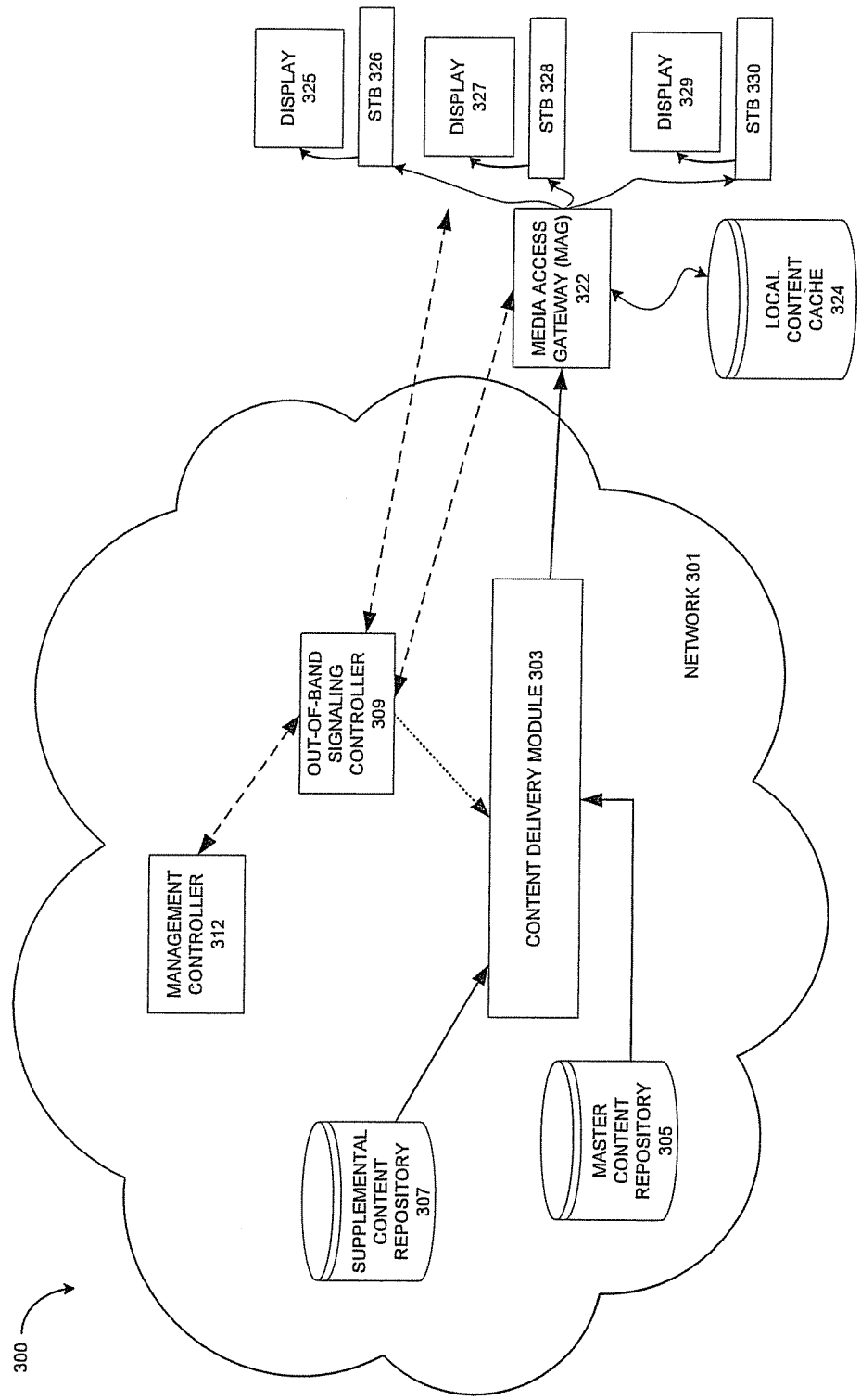
FIG. 3 is a block diagram of a third particular embodiment of a content delivery system.

Referring to FIG. 3, a block diagram of a third particular embodiment of a content delivery system is shown and generally designated 300. The content delivery system 300 includes a content delivery module 303, a master content repository 305, and a supplemental content repository 307 in a network 301. In a particular embodiment, the content delivery module 303, the master content repository 305, and the supplemental content repository 307 deliver master content and supplemental content to a media access gateway (MAG) 322 under control of control signals from an out-of-band signaling controller 309. For example, the content delivery module 303, the master content repository 305, and the supplemental content repository 307 may deliver the master content and the supplemental content to the MAG 322 in a manner such as was described with respect to delivery of master content and supplemental content to the gateway 122 in the various embodiments of the delivery system 100 of FIG. 1.

In a particular embodiment, the master content and supplemental content are delivered by the MAG 322 to end user devices, such as set top box (STB) 326, STB 328 and STB 330. The STB 326 may be configured to display video at a display 325, the STB 328 may be configured to display video at a display 327, and the STB 320 may be configured to display video at a display 329. In addition, the supplemental content may be stored at a local content cache 324 by the MAG 322. In another particular embodiment, the MAG 322 delivers the master content and the supplemental content to the end user devices, such as STB 326, STB 328 and STB 330, and stores the supplemental content at the local content cache 324 in a manner such as was described with respect to delivery of master content and supplemental content to end user devices 126, 128 and 130 in the various embodiments of the delivery system 100 of FIG. 1.

In a particular embodiment, MAG 322 is configured to receive and send signals and information to the out-of-band signaling controller 309 out-of-band with transmission of the master content and the supplemental content from the content delivery module 303. For example, the MAG 322 may be configured to receive and send signals and information to the out-of-band signaling controller 309 in a manner such as was described with respect to the gateway 122 in various embodiments of the delivery system 100 of FIG. 1.

In a particular embodiment, the out-of-band signaling controller 309 is configured to obtain management information from and store management information at the management controller 312. In a particular embodiment, the management controller 312 may include a content management module, a recommendation module, a customer profile module, an advertising and commerce module and a context data module as described in connection with the management controller 230 of FIG. 2.

Figure 4:
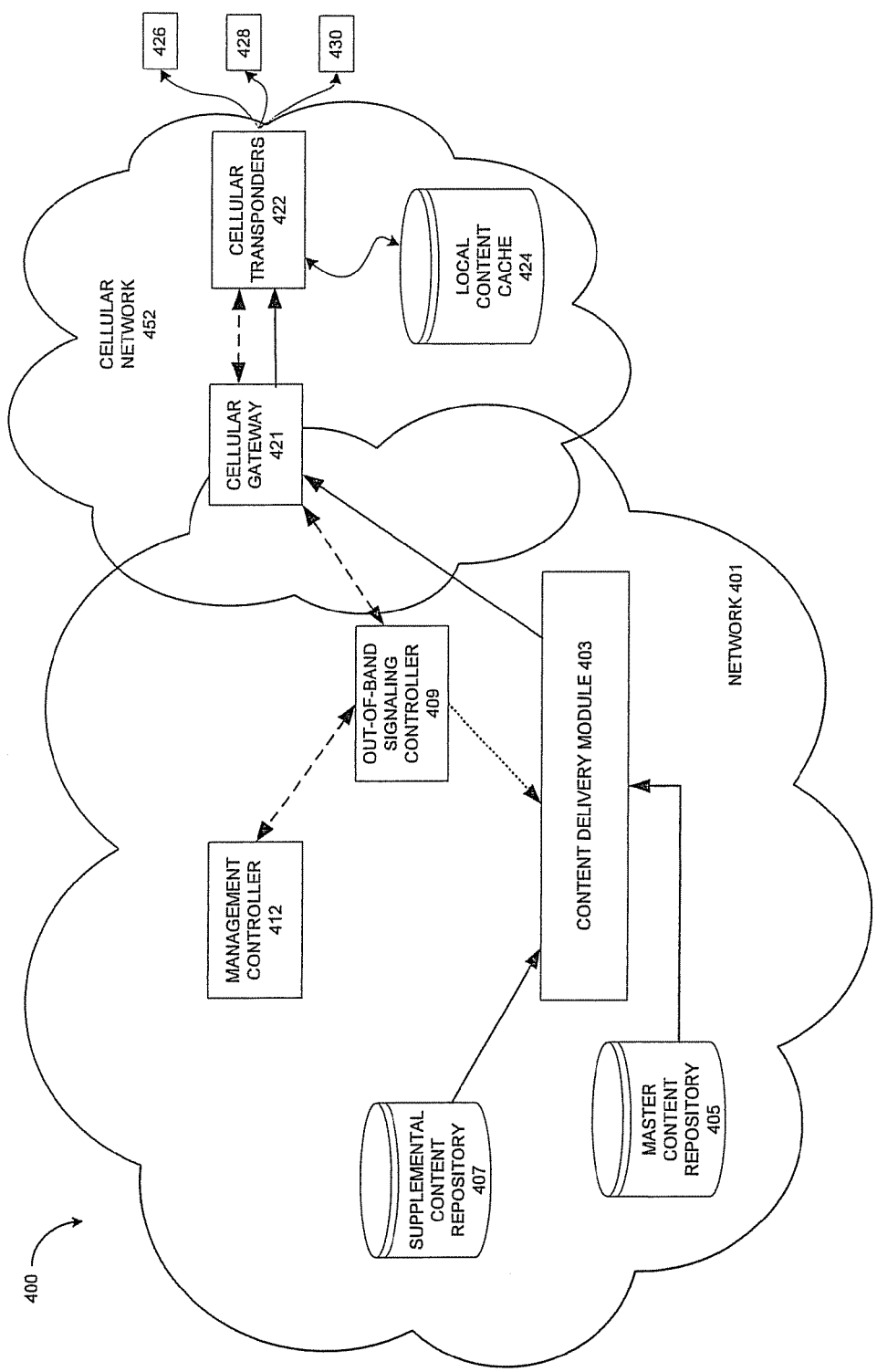
FIG. 4 is a block diagram of a fourth particular embodiment of a content delivery system.

Referring to FIG. 4, a block diagram of a fourth particular embodiment of a content delivery system is illustrated and generally designated 400. The content delivery system 400 includes a content delivery module 403, a master content repository 405, and a supplemental content repository 407 in a network 401. In a particular embodiment, the content delivery module 403, the master content repository 405, and the supplemental content repository 407 deliver master content and supplemental content to a cellular gateway 421 under control of control signals from an out-of-band signaling controller 409. The cellular gateway 421 may be part of a cellular network 452 which includes cellular transponders 422 and a local content cache 424. The cellular transponders 422 may be configured to communicate to end users devices, such as end user devices 426, 428 and 430. The end user devices may include cellular telephones, personal digital assistants, other mobile communications devices, or any combination thereof. In another particular embodiment, the content delivery module 403, the master content repository 405, and the supplemental content repository 407 to deliver the master content and the supplemental content to the cellular gateway 421 in a manner such as was described with respect to delivery of master content and supplemental content to the gateway 122 in the various embodiments of the delivery system 100 of FIG. 1.

In a particular embodiment, the master content and the supplemental content are delivered by the cellular gateway 421 through the cellular transponders 422 to the end user devices 426, 428, 430. In addition, the supplemental content may be stored at the local content cache 424 by the cellular transponders 422. In another particular embodiment, the cellular gateway 421 delivers the master content and the supplemental content through the cellular transponders 422 to the end user devices 426, 428, 430 and the cellular transponders 422 stores the supplemental content at the local content cache 424 in a manner such as was described with respect to the end user devices 126, 128 and 130 in the various embodiments of the delivery system 100 of FIG. 1.

In a particular embodiment, the cellular gateway 421 is configured to receive and send signals and information to the out-of-band signaling controller 409 out-of-band with transmission of the master content and the supplemental content from the content delivery module 403. For example, the cellular gateway 421 may be configured to receive and send signals and information to the out-of-band signaling controller 409 in a manner such as was described with respect to the gateway 122 in various embodiments of the delivery system 100 of FIG. 1.

In a particular embodiment, the out-of-band signaling controller 409 is configured to obtain management information from and store management information at a management controller 412. In a particular embodiment, the management controller 412 may include a content management module, a recommendation module, a customer profile module, an advertising and commerce module and a context data module as described in connection with the management controller 230 of FIG. 2.

Figure 5:
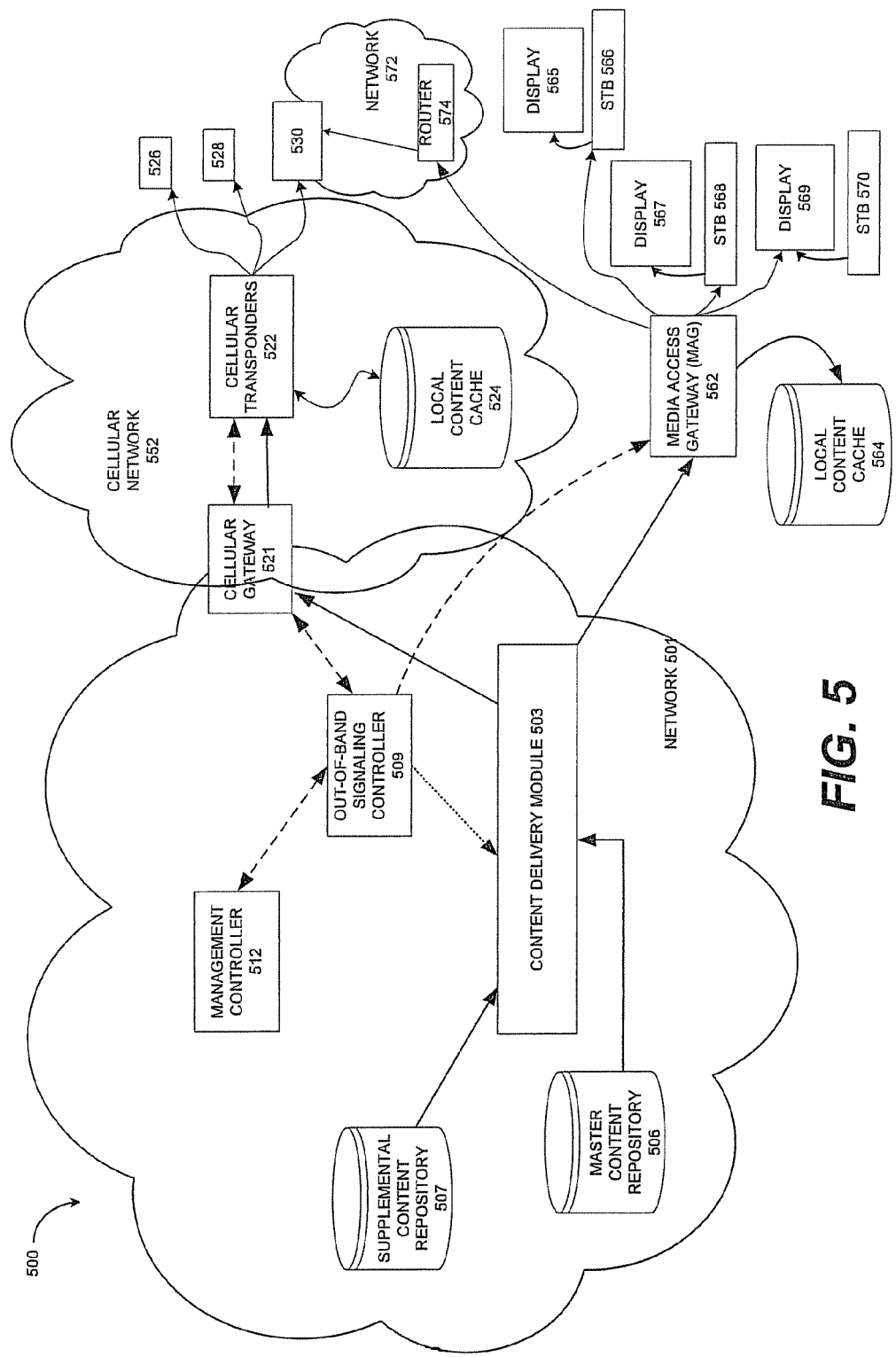
FIG. 5 is a block diagram of a fifth particular embodiment of a content delivery system.

Referring to FIG. 5, a block diagram of a fifth particular embodiment of a content delivery system is illustrated and generally designated as 500. The content delivery system 500 includes a content delivery module 503, a master content repository 505, and a supplemental content repository 507 in a network 501. In a particular embodiment, the content delivery module 503, the master content repository 505, and the supplemental content repository 507 deliver master content and supplemental content to a cellular gateway 521 under control of control signals from an out-of-band signaling controller 509. The cellular gateway 521 may be part of a cellular network 552 which includes cellular transponders 522 and a local content cache 524. The cellular transponders 522 may be configured to communicate to end users devices, such as end user devices 526, 528 and 530. The end user devices 526, 528 and 530 may include cellular telephones, personal digital assistants, other mobile communications devices, or any combination thereof. In another particular embodiment, the content delivery module 503, the master content repository 505, and the supplemental content repository 507 deliver the master content and the supplemental content to the cellular gateway 521 under control of signaling from the out-of-band signaling controller 509 in a manner such as was described with respect to the gateway 122 in the various embodiments of the delivery system 100 of FIG. 1.

In a particular embodiment, the master content and the supplemental content are delivered by the cellular gateway 521 through cellular transponders 522 to the end user devices 526, 528, 530. In addition, the supplemental content may be stored at the local content cache 524 by the cellular transponders 522. In another particular embodiment, the cellular gateway 521 delivers the master content and the supplemental content through the cellular transponders 522 to the end user devices 526, 528, 530 and the cellular transponders 522 may store the supplemental content at the local content cache 524 in a manner such as was described with respect to the various embodiments of the delivery system 100 of FIG. 1.

In a particular embodiment, cellular gateway 521 is configured to receive and send signals and information to the out-of-band signaling controller 509 out-of-band with transmission of the master content and the supplemental content from the content delivery module 503. In another particular embodiment, the cellular gateway 521 is configured to receive and send signals and information to the out-of-band signaling controller 509 in a manner such as was described with respect to the gateway 122 in the various embodiments of the delivery system 100 of FIG. 1.

In a particular embodiment, the content delivery module 503, the master content repository 505, and the supplemental content repository 507 also deliver master content and supplemental content to a media access gateway (MAG) 562 under control of control signals from the out-of-band signaling controller 509. In another particular embodiment, the content delivery module 503, the master content repository 505, and the supplemental content repository 507 deliver the master content and the supplemental content to the MAG 562 under control of signaling from the out-of-band signaling controller 509 in a manner such as was described with respect to delivery of master content and supplemental content to the gateway 122 in the various embodiments of the delivery system 100 of FIG. 1.

In a particular embodiment, the master content and the supplemental content are delivered by the MAG 562 to end user devices, such as a set top box (STB) 566, a STB 568 and a STB 570. The STB 566 may be configured to display video at a display 565, the STB 568 may be configured to display video at a display 567 and the STB 520 may be configured to display video at a display 569. In addition, the supplemental content may be stored at a local content cache 564 by the MAG 562. In another particular embodiment, the MAG 562 delivers the master content and the supplemental content to the STBs 566, 568, 570 and stores the supplemental content at the local content cache 564 in a manner such as was described with respect to the gateway 122 in various embodiments of the delivery system 100 of FIG. 1.

In a particular embodiment, the end user device 530 may be capable of communicating both with the cellular transponder 522 and over another network 572. The network 572 may be, for example, a WiFi network and the end user device 530 may be a WiFi-capable cellular telephone. When the end user device 530 is within range of the network 572, content may be communicated to the end user device 520 through a router 574 from the MAG 562. The ability to communicate content to the end user device 530 over either the cellular network 562 or over the network 572 provides additional flexibility and capability. For example, communication of content over the cellular network 562 may be more limited and expensive than communication over the MAG 562 and the network 572. In that case, content, including both master content and supplemental content may be communicated over the MAG 562 and the network 572 to the end user device 530 when the end user device 530 is within range of network 572. Control signals, such as out-of-band control signals from the out-of-band signaling controller 509, typically consume considerably less bandwidth than content. Therefore, out-of-band control signals can be used to control the delivery of the content when the end user device 530 is in communication with the network 572. Further, out-of-band control signals can be used to control display of the content whether the end user device 530 is in communication with cellular network 552, with network 572, or with both. In certain cases, it may be desirable to deliver content to the end user device 530 even when the end user device 530 is not in communication with network 572 and, in such a case, content can be delivered over the cellular network 552 as has been described.

In a particular embodiment, the MAG 562 is configured to receive and send signals and information to the out-of-band signaling controller 509 out-of-band with transmission of the master content and the supplemental content from the content delivery module 503. In another particular embodiment, the MAG 562 is configured to receive and send signals and information to the out-of-band signaling controller 509 in a manner such as was described with respect to the gateway 122 in the various embodiments of the delivery system 100 of FIG. 1.

In a particular embodiment, out-of-band signaling controller 509 is configured to obtain management information from and to store management information at a management controller 512. In a particular embodiment, the management controller 512 may include a content management module, a recommendation module, a customer profile module, an advertising and commerce module and a context data module as described in connection with the management controller 230 of FIG. 2.

Figure 6:
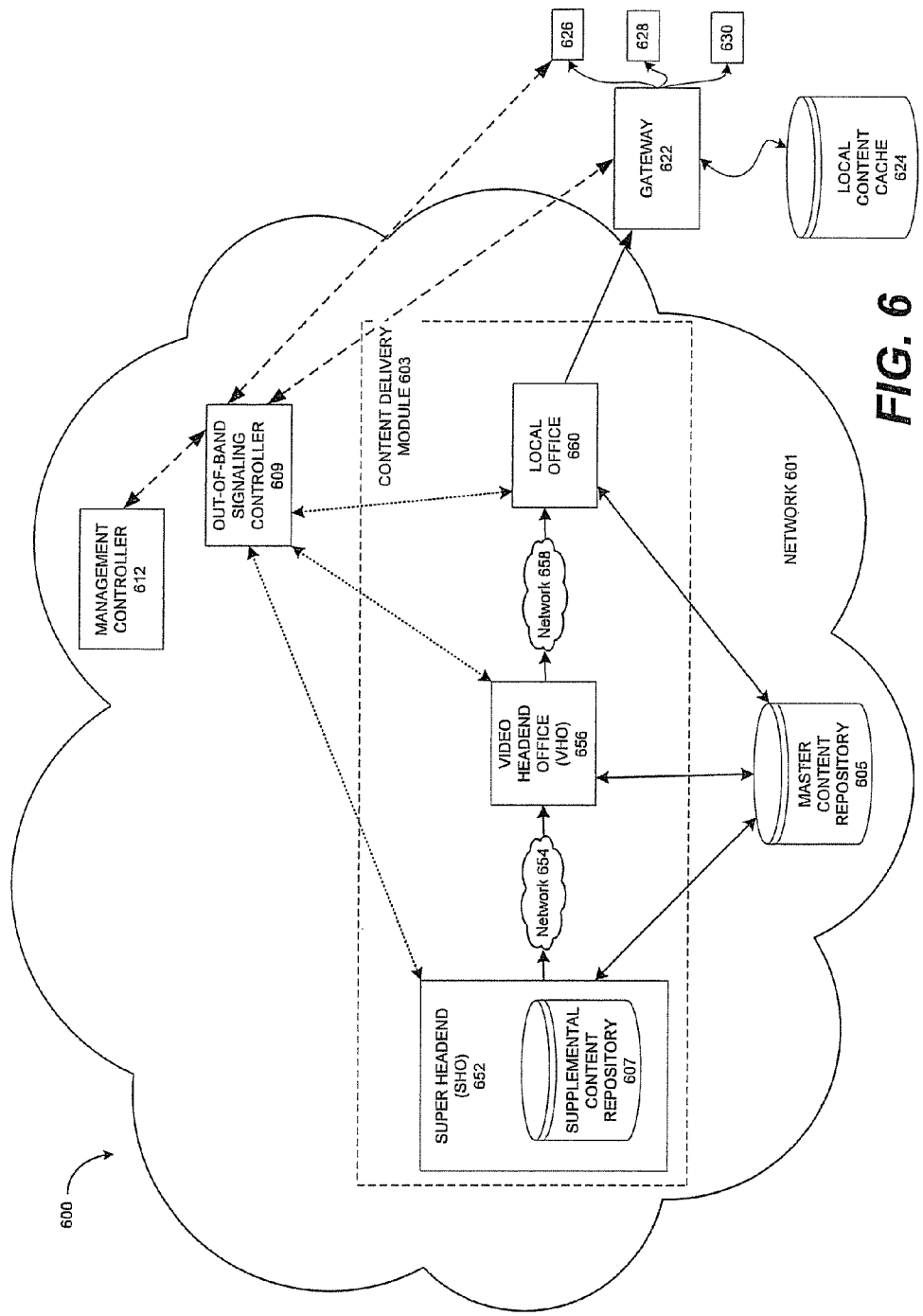
FIG. 6 is a block diagram of a sixth particular embodiment of a content delivery system.

Referring to FIG. 6, a block diagram of a sixth particular embodiment of a content delivery system is illustrated and generally designated as 600. The content delivery system 600 includes a content delivery module 603, a master content repository 605, and a supplemental content repository 607 in a network 601. In a particular embodiment, the content delivery module 603, the master content repository 605, and the supplemental content repository 607 may function to deliver master content and supplemental content to a gateway 622 under control of control signals from an out-of-band signaling controller 609. In another particular embodiment, the content delivery module 603, the master content repository 605, and the supplemental content repository 607 may function to deliver the master content and the supplemental content to the gateway 622 under control of signaling from the out-of-band signaling controller 609 in a manner such as was described with respect to the various embodiments of the delivery system 100 of FIG. 1.

In a particular embodiment, the master content and the supplemental content are delivered by the gateway 622 to end user devices, such as end user devices 626, 628 and 630. In addition, the supplemental content may be stored at a local content cache 624 by the gateway 622. In another particular embodiment, the gateway 622 delivers the master content and the supplemental content to the end user devices 626, 628, and 630 and stores the supplemental content at the local content cache 624 in a manner such as was described with respect to the various embodiments of the delivery system 100 of FIG. 1.

In a particular embodiment, gateway 622 is configured to receive and send signals and information to the out-of-band signaling controller 609 out-of-band with transmission of the master content and the supplemental content from the content delivery module 603. In another particular embodiment, the gateway 622 is configured to receive and send signals and information to the out-of-band signaling controller 609 in a manner such as was described with respect to the various embodiments of the delivery system 100 of FIG. 1.

In a particular embodiment, the content delivery module 603 may include a super headend (SHO) 652 which may include the supplemental content repository 607. The SHO 652 may be configured to communicate over the network 654 with a video headend office (VHO) 656. The VHO 656 may be configured to communicate over a network 658 with one or more local offices 660. The local offices 660 may be configured to communicate with the gateway 622.

In a particular embodiment, the out-of-band signaling controller 609 is configured to obtain management information from and store management information at a management controller 612. In a particular embodiment, the management controller 612 may include a content management module, a recommendation module, a customer profile module, an advertising and commerce module and a context data module as described in connection with the management controller 230 of FIG. 2.

Figure 7:
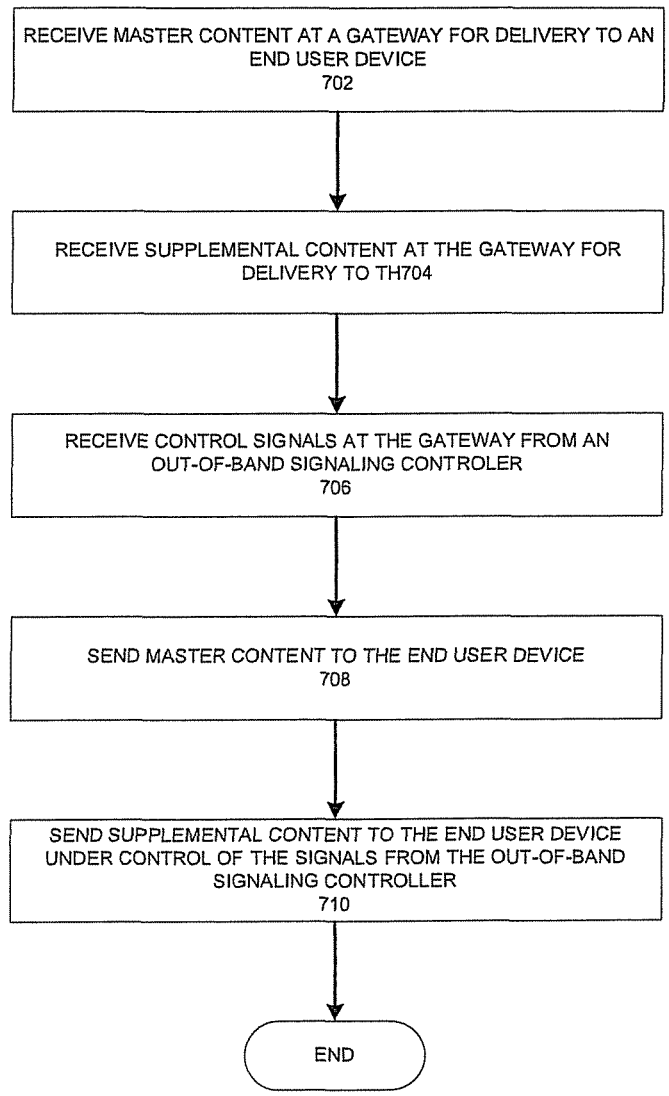
FIG. 7 is a flow diagram illustrating a particular method of delivering content.

Referring to FIG. 7, a flow diagram illustrating a method of delivering supplemental content is described and generally designated as 700. In a particular embodiment, master content may be received at a gateway for delivery to an end user device, at 702. The master content may include video programming and may be received from a content delivery system. For example, the master content may be television programming. Supplemental content may also be received at the gateway for delivery to the end user device, at 704. The supplemental content may include advertisements. In a particular embodiment, the supplemental content includes advertisements and the master content includes slots for insertion of the advertisements.

The gateway may receive control signals, out-of-band from receiving the master content and the supplemental content, from an out-of-band signaling controller, at 706. In a particular embodiment, the gateway is configured to receive the control signals and to select particular supplemental content for display at an end user device based on the control signals.

The master content may be sent to an end user device, at 708. In a particular embodiment, the master content is sent to the end user device from the gateway. The supplemental content may be sent to the end user device under control of the signals from the out-of-band controller, at 710.

In particular embodiments, the above-described method 700 of delivering supplemental content to an end user device, may be implemented in a delivery system 100 as in FIG. 1, a content delivery system 200 as in FIG. 2, a content delivery system 300 as in FIG. 3, a content delivery system 400 as in FIG. 4, a content delivery system 500 as in FIG. 5, or a content delivery system 600 as in FIG. 6 or any combination thereof and may utilize the various embodiments discussed in connection therewith.

Figure 8:
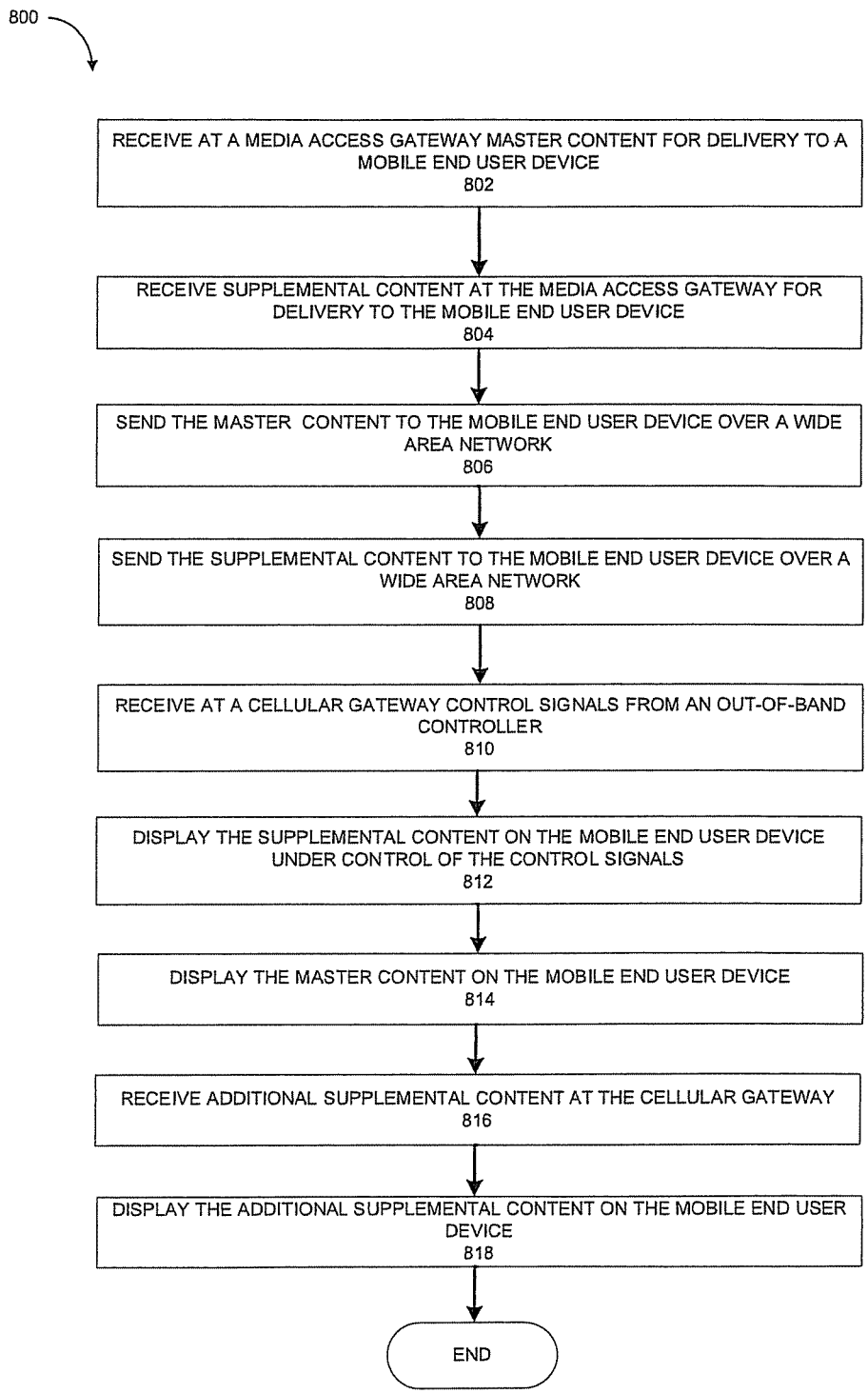
FIG. 8 is a flow diagram illustrating a second particular method of delivering content.

Referring to FIG. 8, a flow diagram illustrating a second particular embodiment of a method of delivering content is described and generally designated as 800. In a particular embodiment, master content for delivery to a mobile end user device is received at a media access gateway, at 802. Supplemental content for delivery to the mobile end user device is received at the media access gateway, at 804. The master content is sent to the mobile end user device over a wide area network, at 806. The supplemental content is sent to the mobile end user device over the wide area network, at 808. Control signals are received at a cellular gateway from an out-of-band controller, at 810. The supplemental content is displayed at the mobile end user device under control of the control signals, at 812. The master content is displayed at the mobile end user device, at 814. Additional supplemental content is received at the cellular gateway, at 816. The additional content is displayed at the mobile end user device, at 818.

Thus, in a particular embodiment, the mobile end user device is capable of communicating both over a cellular network and over a wide area network (WAN). The WAN may be, for example, a WiFi network and the mobile end user device may be a WiFi-capable cellular telephone. When the mobile end user device is within range of the WAN, content may be communicated to the mobile end user device through the WAN. The ability to communicate content to mobile end user device over either the cellular network or over the WAN provides additional flexibility and capability. For example, communication of content over the cellular network may be more limited and expensive than communication over the WAN. In that case, content, including both master content and supplemental content, may be communicated over the WAN to the mobile end user device when the mobile end user device is within range of the WAN. Control signals, such as out-of-band control signals from an out-of-band signaling controller, typically consume considerably less bandwidth than content. Therefore, out-of-band control signals can be used to control the delivery of the content to the mobile end user device so that the content is delivered, if possible, when the end user device 530 is in communication with the WAN. Additionally, out-of-band control signals may be used to control display of the content at the mobile end user device whether the mobile end user device is in communication with the cellular network, with the WAN, or with both. For example, the out-of-band control signals may be sent to the mobile end user device via the cellular network to control display of the content at the mobile end user device. In certain cases, it may be desirable to deliver content to the mobile end user device even when the mobile end user device is not in communication with WAN and, in such cases, content can be delivered over the cellular network.

In particular embodiments, the above-described method 800 of delivering content to the mobile end user device, may be implemented in a delivery system 100 as in FIG. 1, a content delivery system 200 as in FIG. 2, a content delivery system 400 as in FIG. 4, a content delivery system 500 as in FIG. 5, or a content delivery system 600 as in FIG. 6 or any combination thereof and may utilize the various embodiments discussed in connection therewith.

Figure 9:
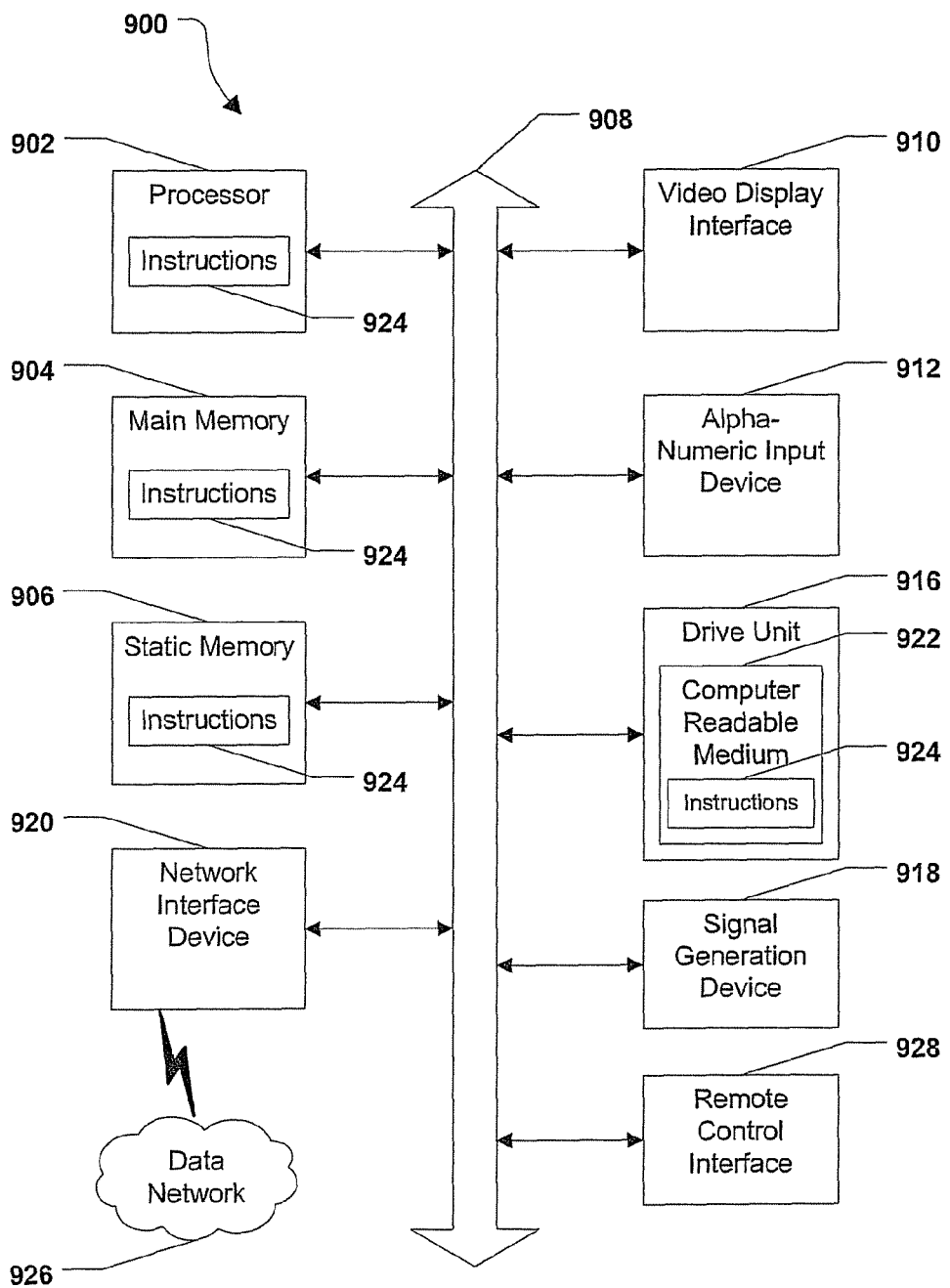
FIG. 9 is a diagram of an illustrative computing system.

Referring to FIG. 9, an illustrative embodiment of a general computer system is shown and is designated 900. The computer system 900 can include a set of instructions that can be executed to cause the computer system 900 to perform any one or more of the methods or computer based functions disclosed herein. The computer system 900 may operate as a standalone device or may be connected, e.g., using a network, to other computer systems or peripheral devices. For example, the computer system 900 may include or be included within any one or more of the content delivery modules, master content repositories, supplemental content repositories, management controllers, out-of-band signaling controllers, gateways, the end user devices, content management modules, recommendation modules, customer profile modules, advertising and commerce modules, context data modules, MAG, STBs, cellular gateways, cellular transponders, SHOs, VHOs, local offices, or other computing devices discusses with reference to FIGS. 1-7, above.

In a networked deployment, the computer system may operate in the capacity of a server or as a client user computer in a server-client user network environment, or as a peer computer system in a peer-to-peer (or distributed) network environment. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics processing unit (GPU), or both. Moreover, the computer system 900 can include a main memory 904 and a static memory 906, that can communicate with each other via a bus 908. As shown, the computer system 900 may further include a video display unit 910, such as a liquid crystal display (LCD), an organic light emitting diode (OLED), a flat panel display, a solid state display, or a cathode ray tube (CRT). Additionally, the computer system 900 may include an input device 912, such as a keyboard, and a cursor control device 914, such as a mouse. The computer system 900 can also include a disk drive unit 916, a signal generation device 918, such as a speaker or remote control, and a network interface device 920.

In a particular embodiment, as depicted in FIG. 9, the disk drive unit 916 may include a computer-readable medium 922 in which one or more sets of instructions 924, e.g. software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924 responsive to a propagated signal, so that a device connected to a network 926 can communicate voice, video or data over the network 926. Further, the instructions 924 may be transmitted or received over the network 926 via the network interface device 920.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable storage medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An out-of-band signaling controller comprising:
   a processor; and
   a memory accessible to the processor, the memory including instructions executable by the processor to:
   receive end user profile information;
   send first signaling to a content delivery module to send master content and supplemental content to a media access gateway based on the first signaling, wherein the first signaling controls selection of first content to be sent to the media access gateway, and wherein the first content includes the master content and the supplemental content;
   send second signaling to the media access gateway to send the master content and the supplemental content to end user devices based on the second signaling, wherein the second signaling controls selection of second content from the first content to be sent from the media access gateway to the end user devices, and wherein the second content includes the master content and the supplemental content; and
   send third signaling to a particular end user device of the end user devices to control display of the master content and the supplemental content at the particular end user device, wherein the third signaling controls selection of the master content and the supplemental content from the second content to be displayed at the particular end user device, and wherein the end user profile information is associated with a user of the particular end user device,
   wherein the first signaling, the second signaling, and the third signaling are sent out-of-band from delivery of the master content and the supplemental content,
   wherein the third signaling is sent to the particular end user device via a cellular network, and
   wherein the master content and the supplemental content are sent to the particular end user device via the media access gateway using a wide area network when the particular end user device is within range of the wide area network.

2. The out-of-band signaling controller of claim 1, wherein the particular end user device is a mobile device.

3. The out-of-band signaling controller of claim 2, wherein the mobile device includes a cellular telephone, a personal digital assistant, or any combination thereof.

4. The out-of-band signaling controller of claim 1, wherein the media access gateway stores content received from the content delivery module at a local content cache.

5. The out-of-band signaling controller of claim 1, wherein the out-of-band signaling controller is an internet protocol (IP) multimedia subsystem (IMS) session initiation protocol (SIP) controller.

6. The out-of-band signaling controller of claim 1, wherein the second signaling is based on a characteristic of the user and wherein the characteristic includes a political orientation of the particular end user, an occupation of the particular end user, or any combination thereof.

7. The out-of-band signaling controller of claim 1, wherein the second signaling is based on a location of the particular end user device.

8. The out-of-band signaling controller of claim 1, wherein the second signaling is based on a bidding function.

9. A method comprising:
   receiving end user profile information at an out-of-band signaling controller;
   sending first signaling to a content delivery module to send master content and supplemental content to a media access gateway based on the first signaling, wherein the first signaling controls selection of first content to be sent to the media access gateway and, wherein the first content includes the master content and the supplemental content;
   sending second signaling to the media access gateway to send the master content and the supplemental content to end user devices based on the second signaling, wherein the second signaling controls selection of second content from the first content to be sent from the media access gateway to the end user devices, and wherein the second content includes the master content and the supplemental content; and
   sending third signaling to a particular end user device of the end user devices to control display of the master content and the supplemental content at the particular end user device, wherein the third signaling controls selection of the master content and the supplemental content from the second content to be displayed at the particular end user device, and wherein the end user profile information is associated with a user of the particular end user device,
   wherein the first signaling, the second signaling, and the third signaling are sent out-of-band from delivery of the master content and the supplemental content,
   wherein the third signaling is sent to the particular end user device via a cellular network, and
   wherein the master content and the supplemental content are sent to the particular end user device via the media access gateway using a wide area network when the particular end user device is within range of the wide area network.

10. The method of claim 9, wherein the particular end user device is a mobile device.

11. The method of claim 10, wherein the mobile device includes a cellular telephone, a personal digital assistant, or any combination thereof.

12. The method of claim 9, wherein the media access gateway stores content received from the content delivery module at a local content cache.

13. The out-of-band signaling controller of claim 9, wherein the out-of-band signaling controller is an internet protocol (IP) multimedia subsystem (IMS) session initiation protocol (SIP) controller.

14. The method of claim 9, wherein the second signaling is based on a characteristic of the user and wherein the characteristic includes a political orientation of the particular end user, an occupation of the particular end user, or any combination thereof.

15. The method of claim 9, wherein the second signaling is based on a location of the particular end user device.

16. The method of claim 9, wherein the second signaling is based on a bidding function.

17. A computer readable storage device storing instructions that when executed by a processor cause the processor to perform operations comprising:

- receiving end user profile information at an out-of-band signaling controller;
- sending first signaling to a content delivery module to send master content and supplemental content to a media access gateway based on the first signaling, wherein the first signaling controls selection of first content to be sent to the media access gateway, and wherein the first content includes the master content and the supplemental content;
- sending second signaling to the media access gateway to send the master content and the supplemental content to end user devices based on the second signaling, wherein the second signaling controls selection of second content from the first content to be sent from the media access gateway to the end user devices, and wherein the second content includes the master content and the supplemental content; and
- sending third signaling to a particular end user device of the end user devices to control display of the master content and the supplemental content at the particular end user device, wherein the third signaling controls selection of the master content and the supplemental content from the second content to be displayed at the particular end user device, and wherein the end user profile information is associated with a user of the particular end user device,
- wherein the first signaling, the second signaling, and the third signaling are sent out-of-band from delivery of the master content and the supplemental content,
- wherein the third signaling is sent to the particular end user device via a cellular network, and
- wherein the master content and the supplemental content are sent to the particular end user device via the media access gateway using a wide area network when the particular end user device is within range of the wide area network.

18. The computer readable storage device of claim 17, wherein the second signaling is based on a characteristic of the end user and wherein the characteristic includes a political orientation of the user, an occupation of the user, or any combination thereof.

19. The computer readable storage device of claim 17, wherein the second signaling is based on a location of the particular end user device.

20. The computer readable storage device of claim 17, wherein the second signaling is based on a bidding function.

* * * * *